United States Patent
Bishop (12)

(10) Patent No.: US 6,211,483 B1
(45) Date of Patent: Apr. 3, 2001

(54) MULTIPLE BEAM LASER WELDING APPARATUS

(75) Inventor: Bob Bishop, Newmarket (CA)

(73) Assignee: Automated Welding Systems Inc., Markham (CA)

( * ) Notice: Subject to any disclaimer, the term of this patent is extended or adjusted under 35 U.S.C. 154(b) by 0 days.

(21) Appl. No.: 09/308,287

(22) PCT Filed: Feb. 24, 1998

(86) PCT No.: PCT/CA98/00153
§ 371 Date: May 12, 1999
§ 102(e) Date: May 12, 1999

(87) PCT Pub. No.: WO98/39136
PCT Pub. Date: Sep. 11, 1998

(30) Foreign Application Priority Data

Mar. 6, 1997 (CA) .................................................. 2199355

(51) Int. Cl.$^7$ ........................... B23K 26/26; B23K 26/067
(52) U.S. Cl. ............................... 219/121.63; 219/121.64; 219/121.77; 219/121.83
(58) Field of Search .................... 219/121.63, 121.64, 219/121.83, 121.77, 121.8

(56) References Cited

U.S. PATENT DOCUMENTS

| | | | |
|---|---|---|---|
| 4,691,093 | * | 9/1987 | Banas et al. ..................... 219/121.63 |
| 5,155,323 | * | 10/1992 | Macken ........................... 219/121.64 |
| 5,841,097 | * | 11/1998 | Esaka et al. ..................... 219/121.63 |
| 5,925,268 | | 7/1999 | Britnell .......................... 219/121.63 |
| 6,087,619 | * | 7/2000 | Berkmanns et al. ............. 219/121.63 |

FOREIGN PATENT DOCUMENTS

| | | |
|---|---|---|
| WO 96 32219 | 10/1996 | (WO) . |
| WO 98 51442 | 11/1998 | (WO) . |

OTHER PUBLICATIONS

Patent Abstracts of Japan, vol. 010, No. 047 (M–456), Feb. 25, 1986, 1 page and JP 60 199585 A (Toshiba KK) Oct. 9, 1985.

Patent Abstracts of Japan, vol. 1995, No. 06, Jul. 31, 1995, 1 page, and JP 07 060470 A (Sumitomo Heavy Ind Ltd.), Mar. 7, 1995.

"Multi–Beam Technique to Increase Power, Flexibility and Quality" F. Dausinger, R. Hack, University of Stuttgart, Stuttgart, Germany Published circa 1996, proceedings of ECLAT '96, pp. 1–10.

* cited by examiner

Primary Examiner—Geoffrey S. Evans
(74) Attorney, Agent, or Firm—Riches, McKenzie & Herbert LLP

(57) ABSTRACT

A laser welding apparatus for use in industrial processing, which is operable to emit laser energy to weld blanks and the like together along a seamline. The emitted laser energy comprises a multiple beam of two or more coherent light sources. The apparatus is adapted to selectively reposition the orientation of the multiple beam relative to the seamline to compensate for gaps between the abutting portions of the workpieces to be joined.

19 Claims, 6 Drawing Sheets

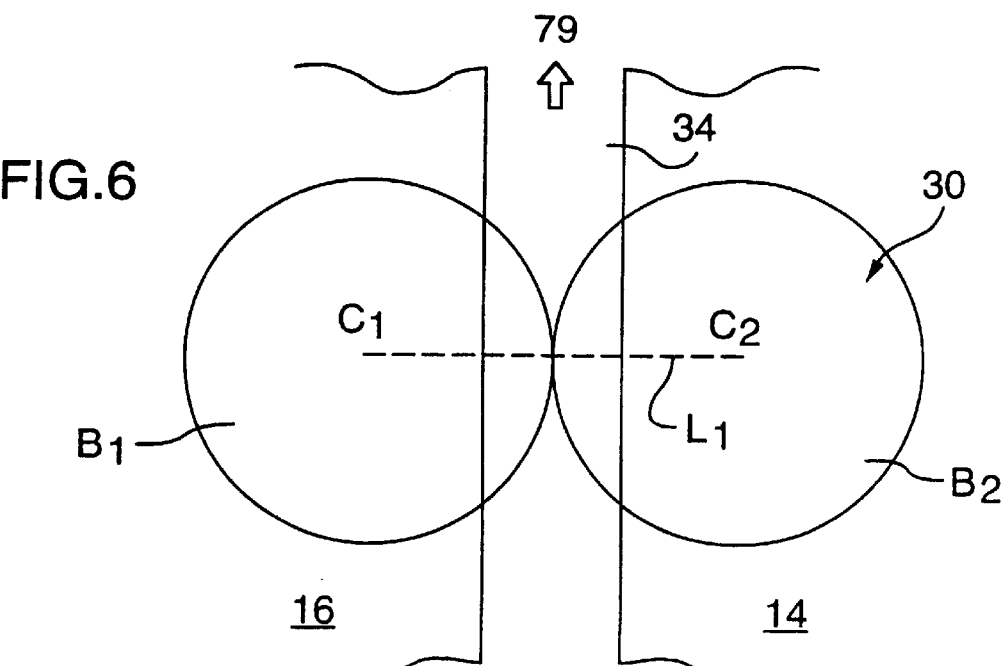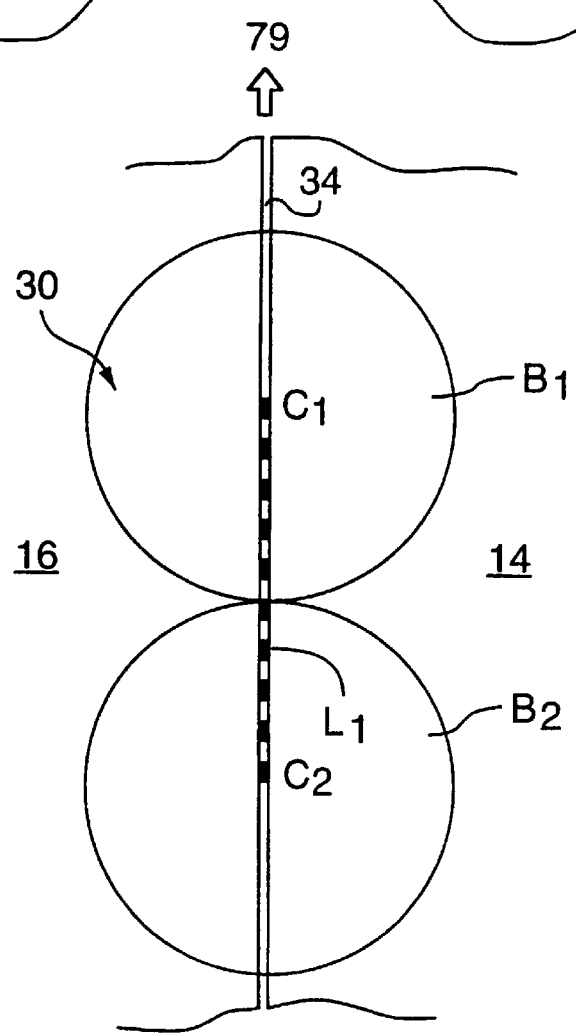

MULTIPLE BEAM LASER WELDING APPARATUS

SCOPE OF THE INVENTION

The present invention relates to a method and an apparatus for laser welding together two or more sheet blanks along a seamline, and more particularly, to an apparatus which adjusts the focal intensity of the laser beam energy on the seamline and/or weld time to compensate for variations in the spacing between the edges of the blanks to be joined.

BACKGROUND OF THE INVENTION

Present day manufacturing requirements often necessitate the formation of various workpiece components by welding together two or more sheet metal blanks. More frequently, lasers have been used to weld abutting edge portions of the sheet blanks along seamlines in the formation of workpiece components.

Conventional laser welding apparatus have suffered the disadvantage in that heretofore, the use of lasers to weld the blanks together has necessitated that the edges of the sheet blanks be pre-finished and have a mirror-smooth finish. The requirements of blank edge preparations have to a large extent been responsible for the reluctance by industries to adapt the use of laser welding apparatus in continuous seam welding processes used to form sheet blanks.

Conventional laser apparatus have suffered the further disadvantage in that to ensure the formation of a complete weld and prevent butt-weld seams having concavity, it is necessary to ensure precise abutting contact between the proximal edges of the sheet metal blanks along the entire length of the weld seam. The necessity of maintaining the sheet blanks in precise contact during welding disadvantageously results in an increase in workpiece production time as a result of the necessity of ensuring the blanks are in an exact abutting position prior to welding.

SUMMARY OF THE INVENTION

The inventor has appreciated an improved apparatus for butt welding together sheet metal blanks which incorporates a yttrium aluminum garnet (YAG) laser, and has disclosed the operation of such an apparatus in pending Canadian patent application serial No. 2,167,111, which was filed Jan. 15, 1996. The use of a YAG laser to butt weld together sheet blanks advantageously has been found to produce weld seams without a concave weld profile, where gaps of up to 0.1 mm exist between the sheet blanks.

The applicant has, however, appreciated that providing an apparatus which may effectively butt weld sheet blanks which are separated by larger gaps, would facilitate workpiece production by requiring less stringent positioning and edge finishing of the sheet blanks prior to welding. This, in turn, would increase production time and reduce sheet blank manufacturing cost.

To at least partially overcome the disadvantages of the prior art, the present invention provides a welding apparatus for use in industrial processing, which is operable to emit an energy beam or ion beam (hereinafter collectively referred to as an energy beam), to weld blanks and the like together along a seamline. The energy beam used to weld the blanks preferably consists of a multiple beam of two or more coherent light sources. The apparatus includes a mechanism to selectively reposition the orientation of the multiple beam relative to the seamline.

Another object of the invention is to provide an apparatus for butt welding together proximal edge portions of two or more sheet blanks which are separated by a gap of up to 0.25 mm or more.

Another object of the invention is to provide an apparatus for laser welding together two or more sheet blanks, without requiring the edge portions of the blanks to be pre-finished.

A further object of the invention is to provide an apparatus for joining together workpiece blanks to form a composite workpiece, and which does not require precise alignment and positioning of the blanks prior to joining.

Another object of the invention is to provide an apparatus for welding together proximal edge portions of sheet blanks having different relative thicknesses.

A further object of the invention is to provide an apparatus for laser butt welding together two or more sheet blanks along a seamline, and which automatically senses the spacing between proximal edge portions of the sheet blanks and compensates either the speed and/or positioning and/or power of the laser energy to ensure the formation of an effective weld seam across the proximal portions.

Another object of the invention is to provide a laser welding apparatus adapted to weld proximal edge portions of sheet metal blanks along either straight, non-linear or curved weld seams.

To achieve at least some of the foregoing objects, the present invention includes a welding apparatus for welding together proximal edge portions of two or more sheet blanks. The welding apparatus is configured to emit a multiple or composite energy beam which consists of two, three or more energy beams. Preferably, the energy beams are laser beams or coherent light sources used to weld the sheet blanks together along a seamline, however, the use of the invention with other energy beams such as ion or electron beams and the like is also possible and will operate in a like manner.

The coherent light sources or laser beams which make up the composite beam are focused towards a portion of the blanks to be welded together at respective focal area or focal spot. The focal areas of each of the laser beams have an optic centre, wherein the optic centres of at least two of the laser beams (i.e. a first laser beam and a second laser beam) which make up the composite beam are spaced or offset from each other.

The spaced optic centres of the first and second laser beams provide the composite beam with a beam energy or intensity profile which is elongated in the orientation of the optic centres. The optic centres of the laser beam may thus be said to each define one end of a focal line of elongation of the composite beam.

The composite beam of laser energy is emitted from a laser head which is movable over the workpiece blanks. The apparatus further includes mechanisms to vary the intensity per unit area of the composite beam. For example, the laser head is preferably rotatably mounted to move the focal line of the composite beam relative to the proximal edge portions of the blanks to be welded. The beam may be moved between a position wherein the focal line is positioned substantially normal to the proximal edge portions of the blanks and a position wherein the focal line is oriented in a position substantially aligned with the proximal edge portions of the workpieces which are to be welded.

Other suitable mechanisms to alter the beam intensity per unit area also would include a drive mechanism used to vary the speed at which the laser head moves over the seamline, or a power regulator used to vary the output power of the laser beams.

The coherent light sources making up the composite beam may, for example, comprise almost any type of laser beam, including $CO_2$ lasers. More preferably, however, high energy lasers, such as yttrium aluminum garnet (YAG) lasers are used to weld the blanks.

The laser head is preferably movably provided in the apparatus to move the composite beam relative to the sheet blanks along a predetermined or sensed linear and/or curved path. The laser may thus be activated and the laser head moved along its sensed/predetermined path to weld proximal edges of the sheet blanks together along a seamline.

More preferably, the apparatus includes a sensing mechanism for sensing the spacing between abutting edge portions of the blanks to be welded. A microprocessor control is provided to rotate the laser head or fiber optic connectors relative to the seamline in response to the sensed spacing. In this manner, the composite beam may be selectively rotated to move the focal line. The focal line may be rotated to a preset orientation relative to the portion of the seamline which is to be formed, as for example, in an orientation at or between a position normal to the abutting edge portions of the blanks and a position substantially aligned thereover.

Where a gap exists between the abutting edge portions of the blanks which are to be joined, the composite beam is positioned so that the optic centres of the first and second laser beams are each located on a respective edge portion of each blank, with the focal line of the composite beam straddling the gap. This position provides a maximum spread of laser energy across the gap producing the maximum infill of molten metal into the gap from the edge portions of the blanks.

Where no gap exists between the abutting edge portions of the blanks, the laser head may be rotated so that the composite beam is positioned with its focal line moved towards or into alignment with the seamline. In this position, the laser energy is focused along the seamline which is to be formed. This advantageously concentrates the intensity of the laser energy along the seamline and decreases the time required to form a complete weld seam, enabling a finished blank to be produced with higher weld speeds.

More preferably, the speed of movement of the laser head above the blank is controlled having regard to the degree of spacing between the proximate portions of the blanks and/or the orientation of the focal line of the composite beam relative to the seamline which is to be formed. As indicated, if desired, the power output of the energy beam could also be varied with any sensed spacing between the abutting edge portions of the blanks. In this manner, higher energy outputs may be provided when the focal line of the beam energy straddles any gap and lower beam energy used when the focal line is aligned with the weld seam.

Accordingly, in one aspect, the present invention resides in an apparatus for joining together proximal edge portions of two workpiece blanks along a seamline comprising, laser means for emitting a composite beam to weld said blanks together along said seamline, said composite beam including a first laser beam and a second laser beam, each of said first and second laser beams being focused towards a portion of said blanks to be welded at respective focal areas having an optic centre, wherein the optic centres of said first and second laser beams are offset from each other and each define one end of a focal line of said composite beam, rotation means for selectively rotating said laser means to move said focal line relative to said portion of said blanks between a position wherein said focal line is oriented substantially normal to said portion of said seamline, and a position wherein said focal line is oriented substantially aligned with said portion of said seamline.

In another aspect, the present invention resides in a laser apparatus for welding together abutting edge portions of two sheet blanks along a seamline, the apparatus comprising:

a laser head operable to emit laser energy to weld said blanks together along the seamline, rotation means for rotating the laser head and change the orientation of said laser energy relative said seamline, wherein said laser energy comprises a multiple beam of at least two offset laser beams.

In a further aspect, the present invention resides in a method as claimed in claim 15, wherein said apparatus further includes sensing means for sensing spacing between the abutting portions of the blanks, and wherein said method includes the further step of sensing the spacing between the adjacent portions of the blanks at said portion of said blanks to be welded prior to moving said focal line therealong, and wherein said preset position of said focal line is determined by the sensed spacing between the adjacent portions of the blanks.

In another aspect, the present invention resides in an apparatus for joining together proximal edge portions of two workpiece blanks along a seamline comprising, means for emitting a composite energy beam to weld said blanks together along said seamline, said composite energy beam including a first energy beam and a second energy beam, each of said first and second energy beams being focused towards a portion of said blanks to be welded at respective focal areas having a centre, wherein the centres of said first and second laser beams are offset from each other and each define one end of a focal line of said composite energy beam, sensor means for sensing any spacing between the proximal edge portions of the blanks, and means for changing the beam intensity per unit area selected from the group consisting of, rotation means for selectively rotating said means for emitting said composite energy beam to move said focal line relative to said portion of said blanks between a position wherein said focal line is oriented substantially normal to said portion of said seamline, and a position wherein said focal line is oriented substantially aligned with said portion of said seamline, drive means for moving said means for emitting said composite energy beam along said seamline, said drive means activatable to vary the speed of movement of said laser beam depending on the sensed spacing between the proximal edge portions of the blanks, and power regulating means to vary the composite energy beam energy output depending on the sensed spacing between the proximal edge portions of the blanks.

BRIEF DESCRIPTION OF THE DRAWINGS

Further objects and advantages of the invention will appear from the following description, taken together with the accompanying drawings in which:

FIG. 6 shows a plan view of the laser beam focal areas of the composite laser beam shown in FIG. 4, wherein the composite beam is oriented with its focal line positioned normal to the abutting portions of the blanks to be welded;

FIG. 7 shows a plan view of the laser beam focal areas of the composite laser beam shown in FIG. 4, wherein the composite beam is oriented with its focal line positioned in alignment with the abutting portions of the blanks to be welded.

DETAILED DESCRIPTION OF THE INVENTION

Figure 1:
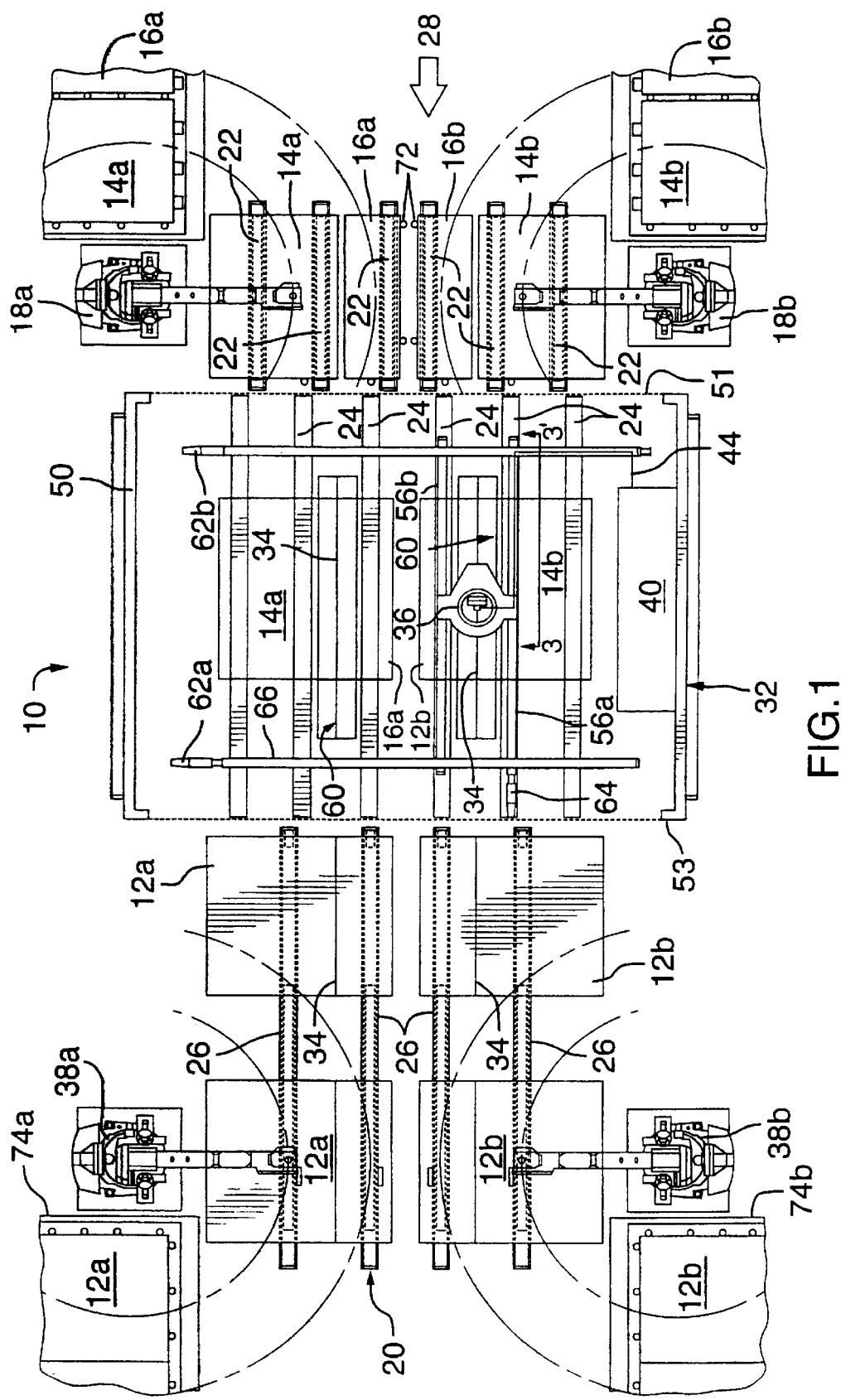
FIG. 1 shows a schematic top view of a production assembly line for forming composite workpieces in accordance with the present invention.

Reference is made to FIG. 1 which shows a production assembly line 10 used in the simultaneous manufacture of two composite workpieces 12a,12b. With the assembly line 10 shown, robot vacuum lifts 18a,18b are used to move pairs of sheet metal blanks 14a,16a, 14b,16b from respective supply stacks. Each robot 18a,18b is adapted to move the paired blanks 14a,16a, 14b,16b, respectively onto a conveyor array 20 used to convey the blanks 14a,16a, 14b,16b and finished workpieces 12a,12b along the assembly line 10. The conveyor array 20 consists of three sets of elongated magnet stepping conveyors 22,24,26 which are operable to move the pairs of blanks 14a,16a and 14b,16b and workpieces 12a,12b in the longitudinal direction of arrow 28. The magnetic stepping conveyors which comprise each conveyor set 22,24,26 are shown in FIG. 1 arranged in a parallel orientation to both each other and the conveyors in the remaining sets. It is to be appreciated that other conveyor configurations are also possible.

As will be described hereafter, the first set of conveyors 22 are used in the initial positioning of the blanks 14a,16a and 14b,16b in the production line 10, and the conveyance of the positioned blanks 14a,16a and 14b,16b on to the second set of conveyors 24.

The conveyors 24 are provided as part of a laser welding station 32 in which the proximal edge portions of the blanks 14a,16a and 14b,16b are welded together along a seamline by a yttrium aluminum garnet (YAG) laser 36. The conveyors 24 thus are used to move the unwelded blanks 14a,16a and 14b,16b to a welding position, and then convey the completed workpiece 12a,12b onto the third set of conveyors 26.

The third set of conveyors 26 are used to convey the completed composite workpieces 12a,12b to robotic vacuum lifts 38a,38b which lift the workpieces 12a,12b therefrom and onto output stacks.

The production line 10 shown in FIG. 1 is configured for the concurrent manufacture of two completed workpieces 12a,12b by a single laser 36. As shown best in FIGS. 1 to 3, the YAG laser 36 includes a coherent light source generator 40 used to generate two coherent light sources or laser beams, a movable laser head assembly 42 (FIG. 2) and a fibre optic coupling 44 (FIGS. 1 and 3) optically connecting the generator 40 and laser head assembly 42. The fibre optic coupling 44 consists of a bundle of two fibre optic cables (not shown). The energy of the two coherent light sources generated in the generator 40 thus travels via a respective fibre optic cable to the laser head assembly.

Figure 2:
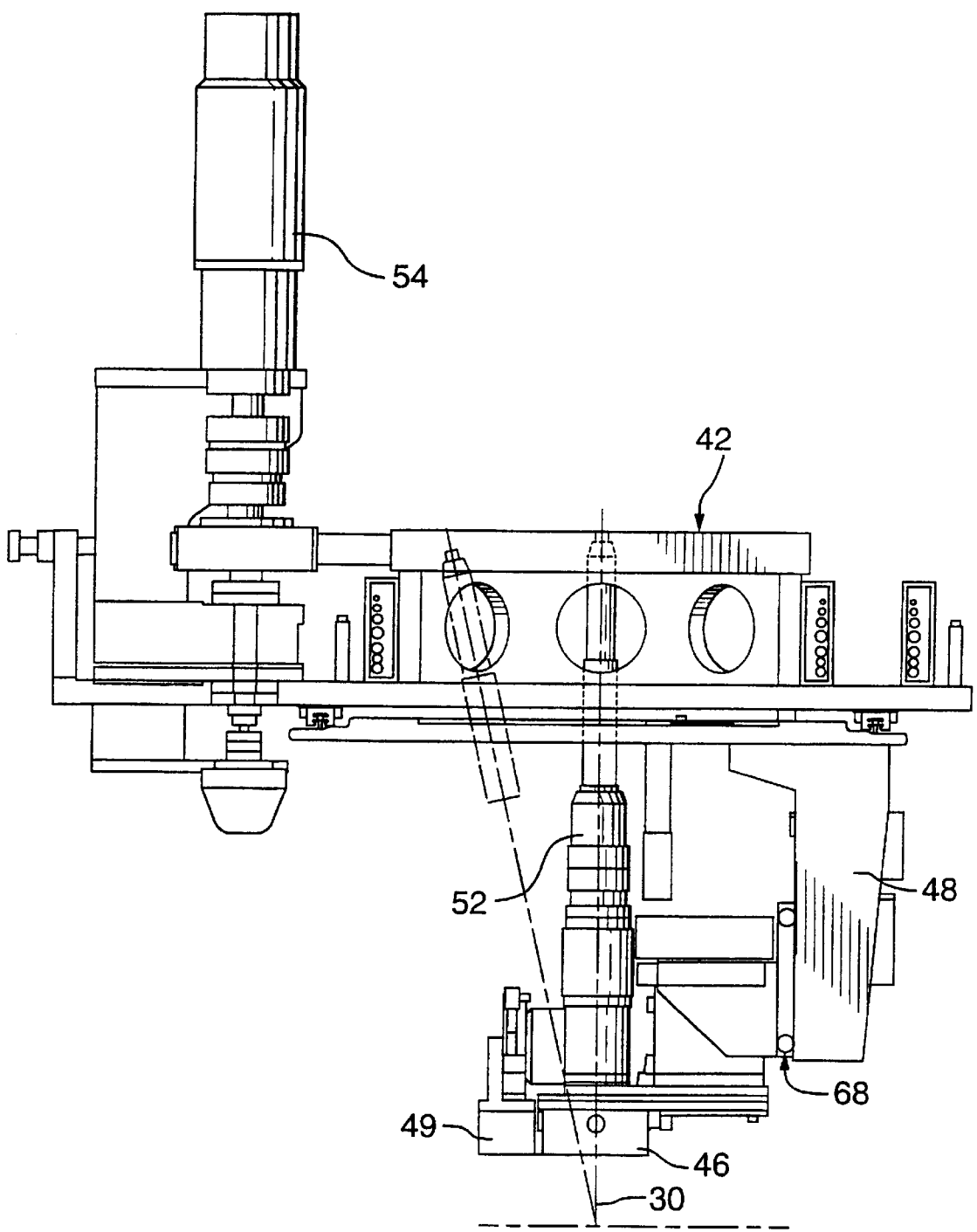
FIG. 2 shows a schematic side view of a laser welding head used in the production assembly line of FIG. 1.

FIG. 2 shows best the laser head assembly 42 includes a light emitting laser head 46 from which laser energy is emitted. As disclosed, the laser energy comprises the composite beam which consists of the two coherent light sources. The assembly 42 further includes a support 48 which rotatably mounts the laser head 46, and a drive motor 52 used to rotate the laser head 46 on the support 48. The laser head assembly 42 may be preprogrammed in movement, but is preferably provided with a microprocessor controlled seam-tracking sensor 49 (FIG. 2). The sensor 49 senses the spacing between the proximal edge portions of each pair of sheet blanks 14a,16a, 14b,16b to be joined. The sensor 49 may, for example, include a separate coherent light source which directs a beam of coherent light downwardly onto the proximal portions of the sheet blanks and a vision or optic sensor for sensing light reflected therefrom. By the absence of reflected light, the vision or optic sensor 49 may thus be used to provide data indicative of the spacing between the abutting edge portions of the sheet blanks. More preferably, the sensor 49 is used to track the seamline 34 and provides control signals to the drive motors 52 and 64 and the gantry robot 54 to automatically position the laser head 42 so that the composite beam 30 is directed at the weld seam.

FIG. 1 shows best the laser 36 as being entirely housed within an enclosure 50. The enclosure 50 is provided with mailbox type entry and exit doors 51,53. The entry and exit doors 51,53 are opened to permit movement of the blanks 14a,16a, 14b,16b and workpieces 12a,12b into and out of the enclosure 50. The entry and exit doors 51,53 are closed during welding operations to optically isolate the laser 36 and contain any potentially eye damaging YAG laser energy.

Clamping units 60 are provided within the enclosure 50 for maintaining the sheet blanks 14a,16a and 14b,16b in fixed abutting position during welding operations. While numerous types of clamping arrangements are possible, the clamping units 60 preferably each consist of a magnetic clamping unit of the type disclosed in the applicant's Canadian patent application serial No. 2,167,111, laid open Jul. 12, 1997.

The entire laser head assembly 42 is configured for two axis movement horizontally. The assembly 42 is movable in a first horizontal direction over the conveyors 24 and blanks 14a,16a, 14,16b via a gantry robot 54, along a paired overhead support and slave support 56a,56b. The laser head assembly 42 moves in the first direction via the gantry robot 54, along a track 58 (FIG. 3) provided on the overhead support 56a. Each of the pairs of supports 56a,56b are further slidable in a second horizontal direction which is perpendicular to the first on parallel spaced end supports 62a,62b.

Each of the end supports 62a,62b in turn movably support the ends of the parallel supports 56a,56b. A servo drive motor 64 (FIG. 1) is provided at the end of support 56a and engages a track 66 which extends along one end of support 62a. The movement of the laser head assembly 42 along the supports 56a,56b, and the movement of the supports 56a, 56b on the end supports 62a,62b permits the laser head 46 to move over the blanks 14a,16a, 14b,16b in any horizontal direction. In addition, it is preferable that the laser head 42 be vertically movable, as for example, by a rack and pinion lift drive mechanism or pneumatic slide 68 (FIG. 2), thereby permitting movement of the laser head 42 along all three axis to provide increased adaptability to the assembly line 10. It is to be appreciated that with this construction, the laser 36 may be used to not only join together workpieces 14a,16a, 14b,16b along preprogrammed linear weld seams, but also along curved weld seams for a variety of different workpieces, without extensive pre-setup and pre-positioning of the sheet blanks.

During welding operations, two coherent light sources are produced in the coherent light source generator 40. The coherent light sources travel via a respective fibre optic cable in the coupling 44 to the laser head 42 and are emitted therefrom towards the portion of the seamline 34 to be laser welded. Two laser beams are thus emitted from the laser head 42 to weld proximal edges of the blanks 14a,16a and 14b,16b as a composite laser beam 30.

Figure 4:
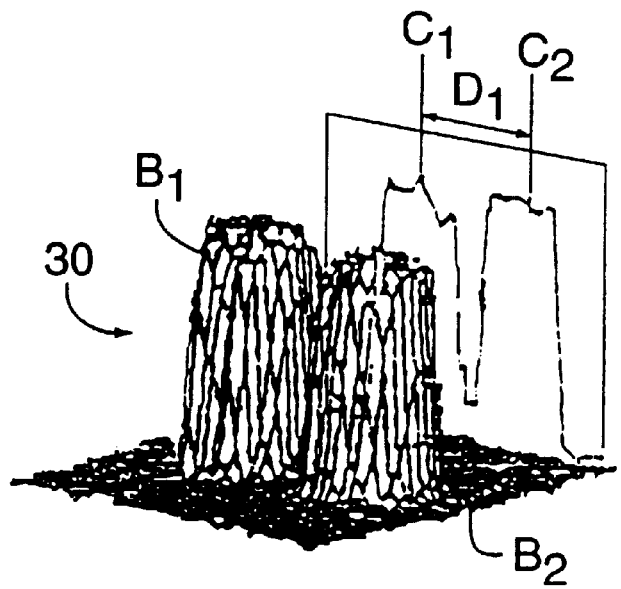
FIG. 4 shows graphically an intensity profile of a composite laser beam in accordance with a first embodiment of the invention.
Figure 5:
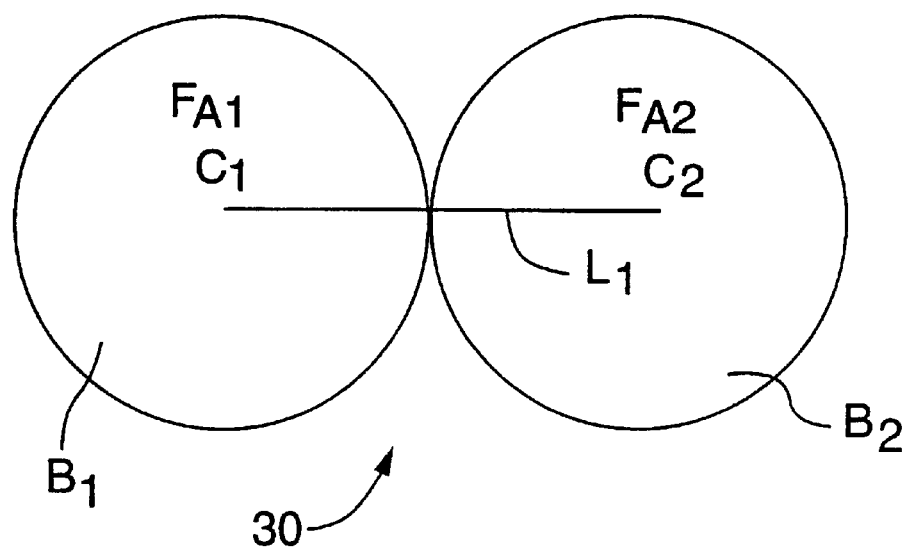
FIG. 5 shows schematically a plan view of the laser beam focal areas of the composite laser beam profile shown in FIG. 4.

FIG. 4 shows graphically the energy profile of the composite beam 30 made up of the two substantially non-overlapping laser beams $B_1, B_2$. FIG. 5 shows best the divergence or focal area $F_{A1}, F_{A2}$ of the two laser beams $B_1, B_2$ at the surface of the workpieces 14,16 to be joined. Each of the laser beams has an optic centre $C_1$ and $C_2$, respectively, and a divergence radius at the workpieces selected at between about 0.2 mm and 1 mm, and more preferably, about 0.6 mm. The optic centres $C_1, C_2$ are offset from each other by a distance $D_1$ (FIG. 4) of between about 0.1 mm to 3.0 mm, and more preferably about 1.2 mm. The optic centres $C_1, C_2$ each define one end of a focal line $L_1$ (FIG. 5) of the composite laser beam 30 which extends in the direction along which the energy spread of the laser beam 30 is elongated.

In operation of the assembly line 10, pairs of component sheets 14a,16a and 14b,16b are moved sequentially via the robotic vacuum lifts 18a,18b from respective supply stacks. The pairs of blanks 14a,16a and 14b,16b are positioned on the parallel magnetic feed conveyors 22. The robotic vacuum lifts 18a,18b are used to move each component sheets 14a,16a, 14b,16b, respectively, through an initial qualifying procedure. The qualifying procedure ensures correct positioning of the sheets on the feed conveyors 22, and involves sliding the sheet blanks 14,16 against sets of retractable locating pins 72 (FIG. 1) to ensure the sheet blanks are in the desired initial position.

The vacuum lifts 18a,18b operate with suction cups which have variable suction pressures. Initially, the robotic lifts 18 are operated under a high vacuum pressure to initially pick up the sheet blanks 14a,16a, 14b,16b so as to fixably retain each sheet blank as it is raised from its supply stack. As the sheet is moved in the qualifying procedure, the suction pressure is reduced. The reduced suction pressure is chosen so that the sheet blanks 14a,16a and 14b,16b continue to be retained by the vacuum force of the respective lift 18a,18b, while permitting the blanks to slide laterally relative to the suction cups. The edges of the sheet blanks 14a,16a, 14b,16b are moved against the locating pins 72 to position the sheets 14,16 on the conveyors 22 in a desired initial position. Following the initial qualifying positioning of the sheets 14a,16a, 14b,16b, the vacuum lifts 18a,18b are deactivated to fully release the sheets, and the locating pins 72 are retracted beneath the surface of the conveyors 22 permitting the sheets 22 to be conveyed into the enclosure 50 unhindered.

Following the initial qualifying, the pairs of sheet blanks 14a,16a, 14b,16b are moved into the enclosure 50 for laser welding. The blanks 14a,16a and 14b,16b move from conveyors 22 onto conveyors 24 via the enclosure mail box or sliding door 51. The enclosure 50 functions as a laser operations room and provides an added safety feature, whereby workers are shielded by the room from laser energy which is emitted during laser welding of the blanks.

The conveyors 24 in turn move the blanks 14a,16a, 14b,16b into the magnetic clamping assemblies 60 which are activated magnetically to clamp the pairs of sheet blanks 14a,16a and 14b,16b. The pairs of blanks 14a,16a and 14b,16b are positioned in respective clamping units 60 so that their proximal edge portions which are to be welded together are in a substantially abutting relationship. While it is preferred that the workpiece blanks 14a,16a, 14b,16b be positioned so that their proximal edge portions to be joined precisely abut along the entire length of the seamline 34, the laser 36 advantageously may be used to perform welding operations where gaps of up to 0.3 mm exist between the proximal edge portions, without producing a finished weld seam which has a concave profile.

Following clamping, the laser 36 is activated to emit the composite laser beam 30 from the laser head 42. The laser head 42 is positioned so that each of the laser beams $B_1, B_2$ or contiguous light sources are focused at a respective focal spot or focal area $F_{A1}, F_{A2}$ on the surfaces of one of the pairs of blanks 14a,16a, 14b,16b. The focus of the contiguous light sources is such that the divergence or focal area $F_{A1}, F_{A2}$ of the beam $B_1, B_2$ will have an approximate average diameter of 1.2 mm. The laser beams $B_1, B_2$ are further oriented so that the optic centre $C_1, C_2$ of each beam $B_1, B_2$ is spaced from the other by a distance of 1.2 mm.

To weld the blanks, the coherent light source generator 40 is activated to emit the composite beam 30 from the laser head 46 while it is moved first along the seamline 34 of the blanks 14a,16b and then along the seamline 34 of blanks 14b,16b. The laser head 46 is moved by the movement of the laser head assembly 42 on the supports 56a,56b and 62a,62b by the gantry robot 54 and servo drive motor 64; as well as through its rotation on the support 48 by drive motor 52.

The operation of the laser 36 to weld the individual pairs of blanks 14,16 along the seamline 34 is shown best with reference to FIGS. 6 and 7 which illustrate an enlarged view of the proximal edge portion of the blanks 14,16 which is to be welded. As the laser head 46 moves along each seamline 34 in the direction of arrow 79, the sensor 49 continuously senses the spacing between the abutting edge portions of the sheet blanks 14a,16a, 14b,16b and provides signals to the microprocessor control. Where larger gaps between the proximal edges of the workpiece blanks 14,16 are sensed, as for example is shown in FIG. 6, the microprocessor control activates the motor 52 to rotate the laser head 46 so that the focal line $L_1$ of the composite beam 30 extends generally transverse to the direction of the seamline 34 and head movement, and normal to the portion of the proximal edge portions of the sheet blanks 14,16 which are being welded. Simultaneously, the microprocessor control signals the gantry robot 54 and servo drive motor 64 to slow the horizontal movement of the laser head 46 over the portion of the seamline 34. The slower movement of the laser head 46 thereby increasing the residence time of the laser energy on the corresponding portions of the sheet blanks 14,16 to ensure a complete weld seam is formed.

If desired, simultaneously with the movement of the laser head 46, the power output from the generator 40 may be varied to increase the composite beam 30 output power when the focal line $L_1$ is positioned transverse to the seamline 34. The increased power of the beam 30 would thus compensate for the fact that the focal area of only one laser beam $B_1, B_2$ impinged upon each workpiece 16,14, respectively.

The energy of each laser beam $B_1,B_2$ on each sheet metal blanks 16,14, respectively, penetrates the edge portions of the sheet metal blanks 16,14. The vapour pressure created by vaporized metal from the blanks 14,16 holds the liquid metal in suspension at the edges of the beam until the laser head 46 moves along the joint. The liquified metal from the edge portions of each blank flows into the gap separating the blanks 14,16 and solidifies to form an autogenous, full penetration butt weld.

As the laser head 46 moves along the seamline 34, and the sensor 49 senses that a smaller or no gaps exist between the abutting edge portions of the blanks 14,16, as shown in FIG. 7, the microprocessor control activates the motor 52 to rotate the laser head 46, so that the focal line $L_1$ of the composite beam 30 is aligned over and in the direction of the seamline 34, in the position shown in FIG. 7. In this orientation, the energy of the two laser beams $B_1,B_2$ is focused along the seamline 34. Less residence time is needed to achieve the composite beam 30 vaporization of the metal. As such, the microprocessor control preferably activates the gantry robot 54 and servo drive motor 64 to increase the speed at which the laser head 46 moves horizontally over the seamline 34, speeding workpiece production, and/or decrease the power intensity of the output composite beam 30.

It is to be appreciated that where gaps of a size between the maximum tolerable gap and no gap exist, the microprocessor control activates the motor (or another actuator such as an air cylinder) 52 to rotate the laser head 46 and move the focal line $L_1$ of the composite beam 30 to a position extending obliquely relative to the proximal edge portions of the blanks 14,16.

Following the welding of the pairs blanks 14a,16a and 14b,16b to form the workpieces 12a,12b, the workpieces are moved on conveyors 24, through the exit door 53 and onto the conveyors 26. The conveyors 26 move the completed workpieces 12a,12b to an offload station where the offload robots 38a,38b place the workpieces 12a,12b in offload containers 74a,74b (FIG. 1).

While the preferred embodiment of the invention discloses the use of a rotating laser head 46 to reposition the focal line L of the composite beam 30, the invention is not so limited. If desired, the laser head 46 could be provided with 2, 3, 4 or more selectively activatable fibre optic cables in a bundle, each providing a contiguous energy source. In this manner, by selectively emitting two or more contiguous light sources from the fibre optic bundle, the orientation of the focal line $L_1$ of the composite beam 30 could be varied almost instantaneously.

Similarly, although FIGS. 4 to 7 describe a composite laser beam 30 consisting of two non-overlapping contiguous light sources, the invention is not so limited. The composite beam could, for example, consist of two, three or more laser beams provided having energy profiles with an overlapping or non-overlapping configuration.

Figure 8:
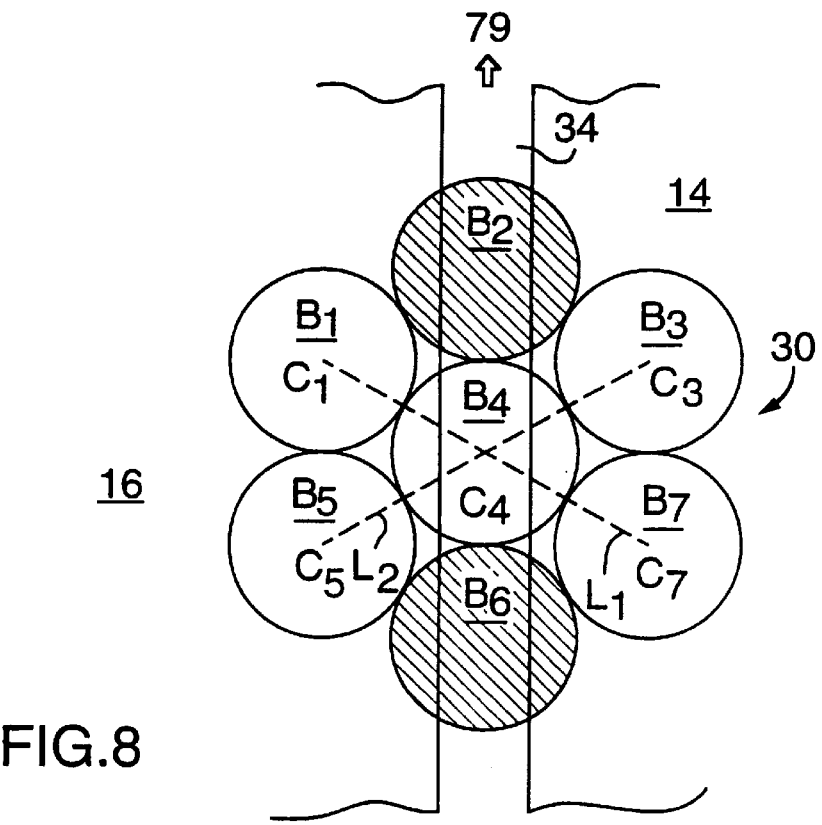
FIGS. 8 and 9 show schematically the laser beam focal areas of a coherent light source bundle for use with the laser of FIG. 1, in accordance with a further embodiment of the invention.

FIGS. 8 an 9 show a further embodiment wherein like reference numerals are used to identify like components. In the embodiment shown, up to seven contiguous light sources $B_1$, $B_2$, $B_3$, $B_4,B_5,B_6,B_7$ be selectively emitted from a fibre optic bundle of seven fiber optic cables (not shown) to form the composite beam 30. Switching between the fibre optic cables in the bundle may be performed, as for example, by the selective activation and deactivation of independent laser energy sources in the generator 40, or by the selective positioning of lenses or other focusing apparatus.

Figure 9:
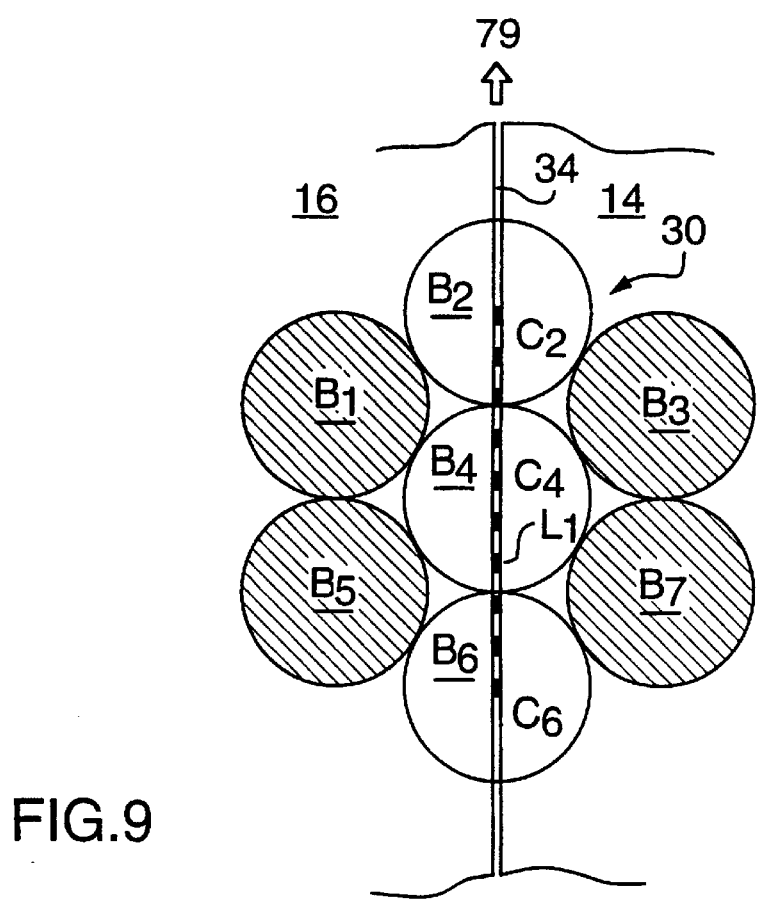

In use, where larger gaps exist between proximal edge portions of blanks 14,16, as shown in FIG. 8, light sources $B_1,B_3,B_4,B_5$ and $B_7$ are simultaneously activated. This effectively provides a composite laser beam 30 which is elongated in two directions along focal lines $L_1$ and $L_2$. As shown in FIG. 8, the focal lines $L_1,L_2$ of the composite beam 30 thus extend obliquely to the direction of seamline 34 and the direction of the movement of laser head 42. The transverse orientation of the beam energy thereby is focused further onto the edge portions of the sheet blanks 14,16. Again, the microprocessor control may be used to signal the gantry robot 54 and servo drive motor 64 to slow the movement of the laser head 46 over the seamline 34, and/or increase the output power of the output laser beams.

Where the proximal edge portions of the blanks 14,16 are in close abutting contact as shown in FIG. 9, light sources $B_2,B_4,B_6$ are emitted as the composite beam 30. The composite beam 30, shown in FIG. 9, therefore has a single focal line $L_1$ which is aligned with the seamline 34. As with the composite beam shown in FIG. 7, the laser energy is thereby focused along the seamline 34 and a shorter residence time is required for the laser beam to form the butt weld. The microprocessor control, therefore may be used to increase the speed by which the laser head 42 moves over the seamline 34 in the direction of arrow 79 in the manner previously described.

In addition, if desired, the fibre optics may be selectively activated so that one or more of the laser beams is provided either aligned with, or off centre from the focal line $L_1$i of the composite beam 30. In this regard, the laser beam $B_2$, shown in FIG. 8, may be used to partially pre-vaporize edge portions of spaced sheet blanks 14,16 to be welded.

The preferred embodiment of the invention discloses the use of a YAG laser for use in butt welding operations, the invention is not so limited. If desired, other lasers may also be used, including $CO_2$ lasers. While the present invention is suitable for use in butt welding together sheet blanks, other welding applications are also possible and will now become apparent.

FIG. 1 shows the simultaneous production of two work pieces 12a,12b, each having a linear seamline 34. If desired, however, the present invention may equally be used to weld one, two or more workpieces along straight, curved or angled seamlines.

Figure 3:
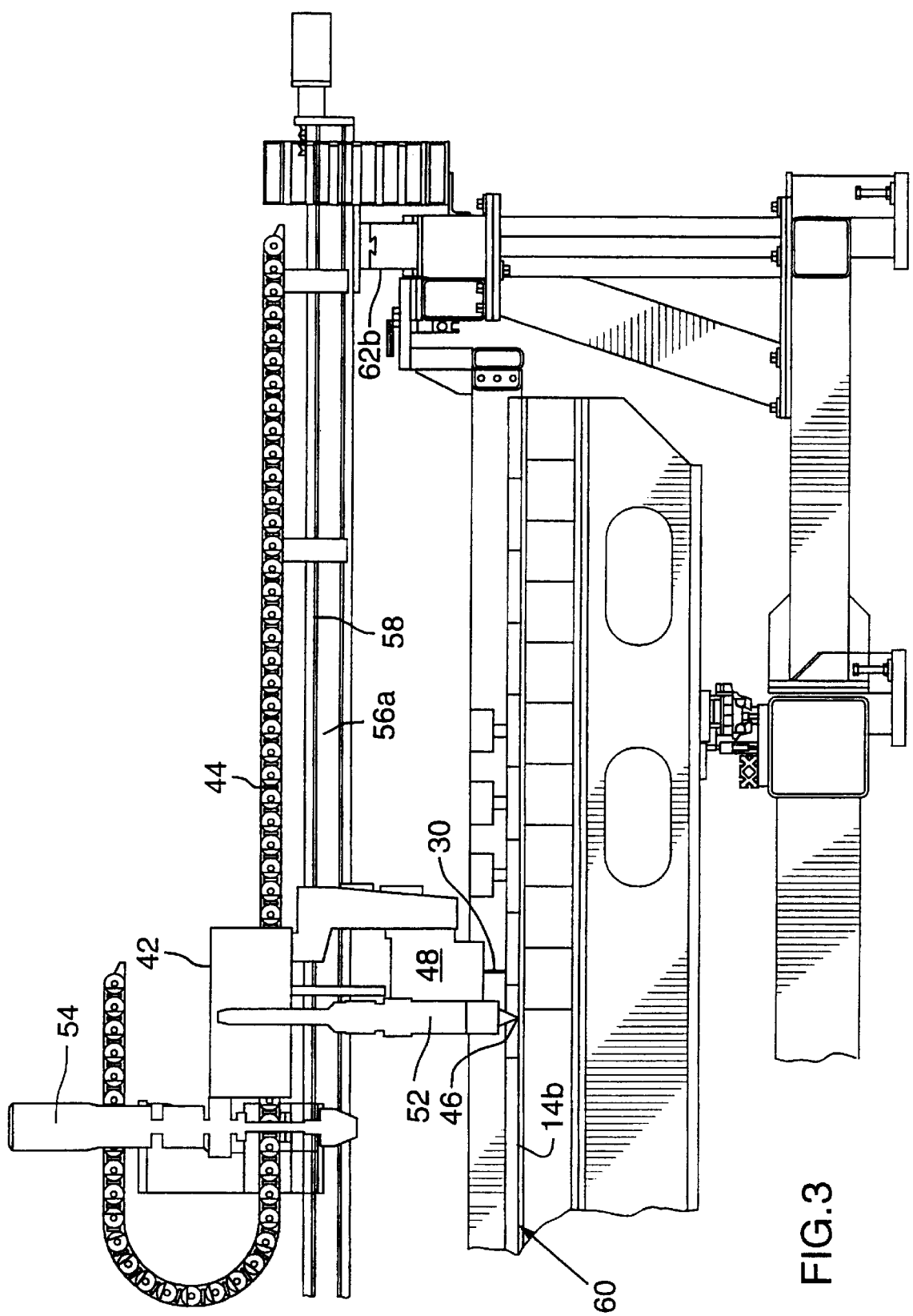
FIG. 3 shows the laser welding apparatus shown in the production assembly line of FIG. 1, taken along lines 3-3' showing the use of a laser to weld sheet blanks.

Although FIGS. 1 to 3 show a production assembly line 10 which incorporates a single laser 36 used to weld pairs of blanks 14a,16a 14b,16b together, the invention is not so limited. If desired, two or more lasers could be used, each with its own movable laser head for simultaneously welding a respective pair of blanks 14,16 along a seamline.

Although the preferred embodiment of the invention discloses the apparatus as including a sensor 49 for continuously sensing the spacing between the sheet blanks 14, the invention is not so limited. In a more cost effective embodiment, the sensor 46 may be omitted. With such a configuration, the positioning of the laser head 42 may be continuously manually adjusted by an operator concurrently as welding operations are performed. Alternately, the laser head 42 may be moved to a fixed initial position which is maintained constant during welding, as for example, when blanks 14 of different thicknesses are to be joined.

While the preferred embodiment of the invention discloses the coherent light source generator 40 as generating separate laser beams, if desired, the energy source could be used to generate a single coherent light source which is separated into two or more laser beams in or en route to the laser head 42.

Although the detailed description describes and illustrates preferred embodiments of the invention, the invention is not so limited. Many modifications and variations will now occur to persons skilled in the art. For a definition of the invention reference may be had to the appended claims.

I claim:

1. An apparatus for joining together proximal edge portions of two workpiece blanks along a seamline comprising,
    a laser for emitting a composite beam to weld said blanks together along said seamline,
    said composite beam including a first laser beam and a second laser beam, each of said first and second laser beams being focused towards a portion of said blanks to be welded at respective focal areas having an optic centre, wherein the optic centres of said first and second laser beams are offset from each other and each define one end of a focal line of said composite beam,
    rotation mechanism for selectively altering the orientation of said composite beam to move said focal line relative to said portion of said blanks between a position wherein said focal line is oriented out of alignment with said portion of said seamline, and a position wherein said focal line is oriented substantially aligned with said portion of said seamline, a sensing device for sensing spacing between the abutting edge portions of the blanks at said portion of said blanks, and a controller for controlling the rotation mechanism in response to the sensed spacing to change the orientation of said composite beam and move said focal line to a preset orientation relative to said portion of said blanks to be welded.

2. An apparatus as claimed in claim 1, wherein said optic centres are offset from each other by a distance between about 0.1 mm to 3 mm.

3. An apparatus as claimed in claim 2, wherein the focal area of each of said first and second laser beams at said seamline has a divergence radius selected at between about 0.2 mm and 1 mm.

4. An apparatus as claimed in claim 1, wherein said sensing device comprises a coherent light source, and
    a sensor for sensing light from said coherent light source.

5. An apparatus as claimed in claim 1, wherein said laser includes a laser head which is movable along a path substantially aligned with said seamline, and
    said apparatus further includes a drive motor activatable to move said laser head along said path, and wherein the speed of movement of said laser head along said path is related to operating factors selected from the group consisting of the sensed spacing and the position of said focal line relative to said portion of said blanks to be welded.

6. An apparatus as claimed in claim 5, wherein the focal area of each of said first and second laser beams has a divergence radius selected at between about 0.2 mm and 1 mm at said seamline.

7. An apparatus as claimed in claim 5, wherein said sensing device comprises a coherent light source, and
    a sensor for sensing light from said coherent light source.

8. An apparatus as claimed in claim 1, wherein said laser device comprises a yttrium aluminum garnet laser.

9. An apparatus as claimed in claim 1, wherein said composite laser beam further includes a third laser beam,
    said third laser beam being focused towards said blanks at a focal area having an optic centre, wherein the optic centre of the third laser beam is intersected by the focal line.

10. An apparatus as claimed in claim 1, wherein said composite laser beam further includes a third laser beam,
    said third laser beam being focused towards said blanks at a focal area having an optic centre, wherein the optic centre of the third laser beam is spaced from the focal line.

11. An apparatus as claimed in claim 10, wherein said optic centres are offset a distance between about 0.1 mm to 3 mm.

12. A laser apparatus for welding together abutting edge portions of two sheet blanks along a seamline, the apparatus comprising:
    a laser head operable to emit laser energy to weld said blanks together along the seamline,
    a rotation mechanism for rotating the laser head and change the orientation of said laser energy relative said seamline,
    a sensor apparatus for sensing spacing between the abutting edge portions of the blanks, and
    a controller for controlling the rotation mechanism in response to the sensed spacing,
    wherein said laser energy comprises a multiple beam of at least two offset laser beams.

13. An apparatus as claimed in claim 12, herein said sensor apparatus comprises a coherent light source, and a sensor for sensing light from said coherent light source.

14. A method of using an apparatus to join together abutting portions of two workpiece blanks along a seamline, the apparatus including,
    laser device for emitting a composite beam to weld said blanks together along said seamline,
    said composite beam including a first laser beam and a second laser beam, each of said first and second laser beams being focused towards a portion of said blanks to be welded at respective focal areas having an optic centre, wherein the optic centres of said first and second laser beams are offset from each other and each define one end of a focal line of said composite beam,
    a rotation mechanism for selectively varying the orientation of said output composite beam to move said focal line relative to said portion of said blanks between a position wherein said focal line is oriented our of alignment with said portion of said seamline, and a position wherein said focal line is oriented substantially aligned with said portion of said seamline,
    wherein said abutting portions of said workpiece blanks are joined by the steps of:
        activating said laser device to direct said composite beam towards said seamline, moving said composite laser beam and said sheet blanks relative to each other to move said focal line along said portion of said blanks to be welded,
        substantially simultaneously with said step of moving, activating said rotation mechanism to move said focal line relative to said portion of said seamline to a preset position determined by the spacing between the workpiece blanks at said portion.

15. A method as claimed in claim 14, wherein during said step of moving said laser beam, said laser beam and said sheet blanks are moved relative to each other at a speed determined by at least one of the position of the focal line relative to the portion of the blanks to be welded and the spacing between the workpiece blanks at said portion.

16. A method as claimed in claim 15, wherein said apparatus further includes a sensor for sensing spacing between the abutting portions of the blanks, and
    wherein said method includes the further step of sensing the spacing between the adjacent portions of the blanks at said portion of said blanks to be welded prior to moving said focal line therealong, and wherein said preset position of said focal line is determined by the sensed spacing between the adjacent portions of the blanks.

17. A method as claimed in claim 14, wherein said apparatus further includes a sensor for sensing spacing between the abutting portions of the blanks, and wherein said method includes the further step of sensing the spacing between the adjacent portions of the blanks at said portion of said blanks to be welded, and wherein said preset position of said focal line is determined by the sensed spacing between the adjacent portions of the blanks.

18. An apparatus for joining together proximal edge portions of two workpiece blanks along a seamline comprising, an emit for emitting a composite energy beam to weld said blanks together along said seamline, said composite energy beam including a first energy beam and a second energy beam, each of said first and second energy beams being focused towards a portion of said blanks to be welded at respective focal areas having a centre, wherein the centres of said first and second energy beams are offset from each other and each define one end of a focal line of said composite energy beam, a sensor for sensing any spacing between the proximal edge portions of the blanks, and a controller for changing the beam intensity per unit area selected from the group consisting of, a rotation drive for selectively rotating said emitter for emitting said composite energy beam to move said focal line relative to said portion of said blanks between a position wherein said focal line is oriented out of alignment with said portion of said seamline, and a position wherein said focal line is oriented substantially aligned with said portion of said seamline, a drive for moving said emitter for emitting said composite energy beam along said seamline, said drive activatable to vary the speed of movement of said energy beam depending on the sensed spacing between the proximal edge portions of the blanks, and a power regulating control to vary the composite energy beam energy output depending on the sensed spacing between the proximal edge portions of the blanks.

19. The apparatus as claimed in claim 18, wherein said first and second energy beams each comprise a coherent light source.

* * * * *